V. BARNES.
Car Brake.
No. 14,385. Patented Mar. 11, 1856.
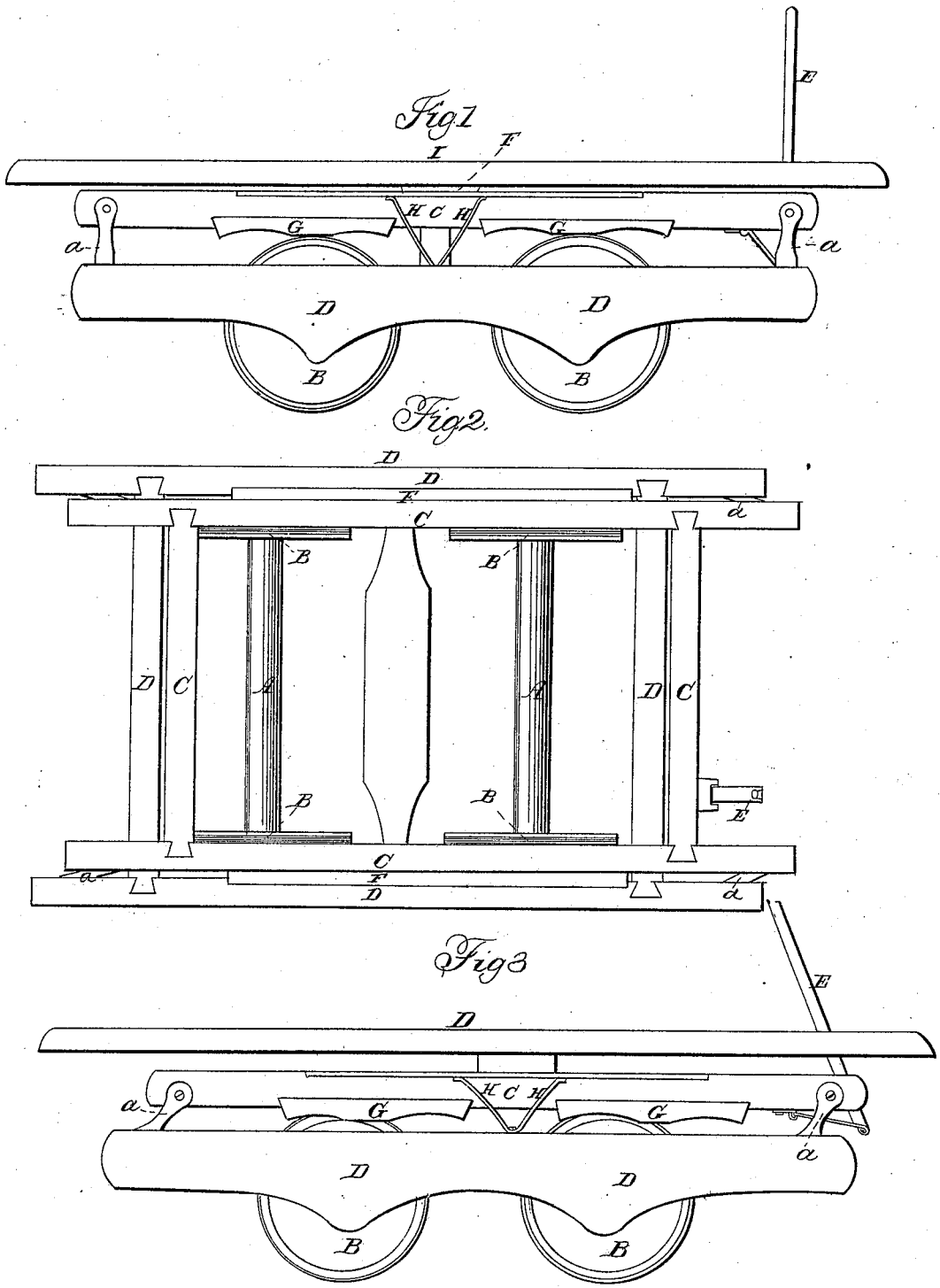

UNITED STATES PATENT OFFICE.

V. BARNES, OF WASHINGTON, DISTRICT OF COLUMBIA.

RAILROAD-CAR BRAKE.

Specification of Letters Patent No. 14,385, dated March 11, 1856.

*To all whom it may concern:*

Be it known that I, VINCENT BARNES, of Washington, District of Columbia, have invented a new and useful Improved Car-Brake; and I do hereby declare that the following is a full and exact description of the same, reference being had to the accompaying drawings and to the letters of reference marked thereon.

In the construction of my brake I use wood, or metal. The frame may be made of wood or iron with the curved rubbers let in, made of either wood or iron; and is made to extend horizontally the whole length of the car, and directly over the wheels, and is attached to the truck by means of four parallel levers or arms, with eyes in them. These are bolted fast to the frame by means of bolts, allowing them to play laterally, as the lever is moved front or rearward.

Figure 1 is a top, or plan view. Fig. 2 is a side view with the brake elevated. Fig. 3 is a side view with the brake down.

In Fig. 1 A the axle, B the wheels, C the brake, D the truck, E the lever for operating the brake, F the metallic plate against which the spring plays and $a$ the levers for fastening the brake to the truck.

In Fig. 2, B the wheels, C the brake, D the truck, E the lever for operating the brake, F the metallic plate, G the rubbers, H the spring, I the platform, $a$ the levers for fastening the brake to the truck.

In Fig. 3 the brake is thrown down on the wheels, the same letters of reference as in Fig. 2.

In the operation of my invention the brake is held clear of the wheels by springs H, causing lever E to stand in a vertical position, and can be held stationary in this position by means of a ratchet for it to catch in, if I find it necessary to do so.

When it is necessary to apply the brake the lever E is pressed in the direction the wheels are running and as soon as the curved rubbers are brought in contact with the wheels, the wheels catch on the same and press them forward; and by means of the levers or arms $a$ they are pressed downward, hugging the periphery of the wheels with the same degree of power that they are pressed forward, thus becoming a self acting brake as soon as the contact is made between the wheels and the rubbers. The power of the brake as well as its self acting, is in proportion as the bearing surface is increased between the vertical and the horizontal lines of the wheel. If it operates on the quarter of the periphery of the wheel between the vertical line, and the horizontal line the brake will be perhaps, too powerful, and would instantly check the motion of the wheels. To prevent this the springs H are to assist in easing the pressure so that the brake will not act too suddenly. When the rubbers bear on only a smaller portion of the wheel the resistance will be in the same proportion. The brake can be brought to bear on two or more cars, by connecting them together by means of an iron rod, and are easily relieved without the necessity of backing off.

Having thus fully described the construction and operation of my invention, what I claim as new and desire to secure by Letters Patent is—

The attaching the frame or brake C to the truck B, by the parallel levers $a$, so as to form a self acting reversible brake operating as herein set forth.

VINCENT BARNES.

Witnesses:
T. G. CLAYTON,
J. C. CLAYTON.